Jan. 30, 1962        H. DEWESE        3,018,546
METHOD OF MAKING A STORAGE TANK CONSTRUCTION
Original Filed Aug. 2, 1956        3 Sheets-Sheet 1

INVENTOR.
Henry Dewese
BY
Owen & Owen
ATTORNEYS

INVENTOR.
Henry Dewese
BY Owen & Owen
ATTORNEYS

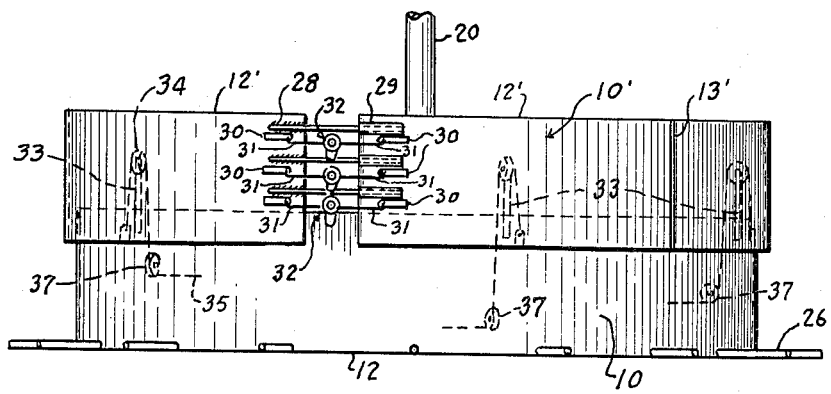
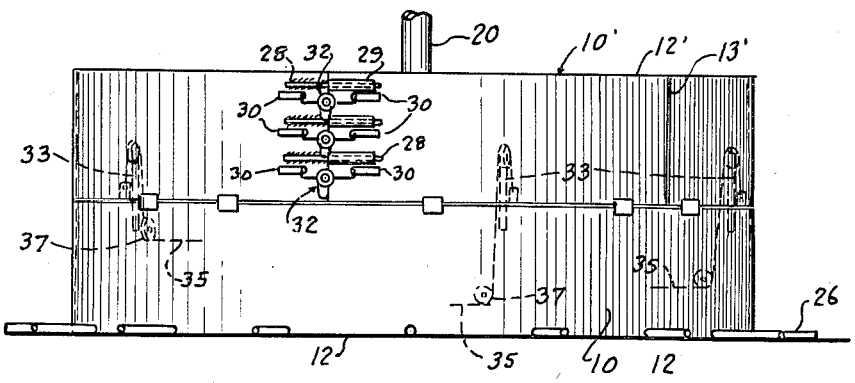

United States Patent Office 3,018,546
Patented Jan. 30, 1962

3,018,546
METHOD OF MAKING A STORAGE TANK CONSTRUCTION
Henry Dewese, Weston, Ohio
Original application Aug. 2, 1956, Ser. No. 601,663. Divided and this application Dec. 22, 1958, Ser. No. 782,169
2 Claims. (Cl. 29—431)

This invention relates to an improved method for constructing cylindrical vessels such as tanks useful for the storage of liquids such as crude oil, and gasoline; towers, e.g., of the type used for catalytic cracking; stacks, and the like.

According to present practice the construction of vessels such as tanks for the storage of various liquids usually requires heavy equipment of the crane-type to position and support, during at least preliminary welding, curved steel sheets from which the vessels are fabricated. U.S. Patent 1,966,244, for example, shows a method for fabricating tanks wherein successive sheets are supported in this way while at least temporary or tack welds are effected. Such a method for fabricating a storage tank has certain disadvantages, one of which is that each successive curved sheet is supported in tension caused by its own weight while it is welded into position. After the welds are completed the support is released, and the stress in the sheet caused by its own weight tends to become compressive. However, the sheet is supported by the temporary welds in the position it assumed as a consequence of the tensile stress, so that release of the support subjects both the sheet and the welds to substantial stress which cannot be relieved. Another difficulty with present day techniques for constructing cylindrical vessels is the high equipment cost which must be charged against each installation, and the extreme difficulty or impossibility often encountered of getting the necessary equipment to inaccessible locations where storage facilities are required.

The present invention is based upon the discovery of a simple method for fabricating cylindrical vessels. Neither individual sheets from which the tanks are fabricated nor welds, whether tack welds or permanent welds, are stressed as a consequence of this fabricating method.

It is, therefore, an object of the invention to provide an improved method for producing such cylindrical vessels as tanks for the storage or crude oil, gasoline; towers; stacks; and the like.

Other objects and advantages will be apparent from the description which follows, reference being had to the accompanying drawings, in which—

FIG. 5 is a view in elevation showing a further step, beyond that represented in FIG. 3, in the fabrication of a tank in accordance with the invention; and FIG. 6 is an elevational view similar to FIG. 5 showing the completion of the step represented in FIG. 5.

Figure 1:
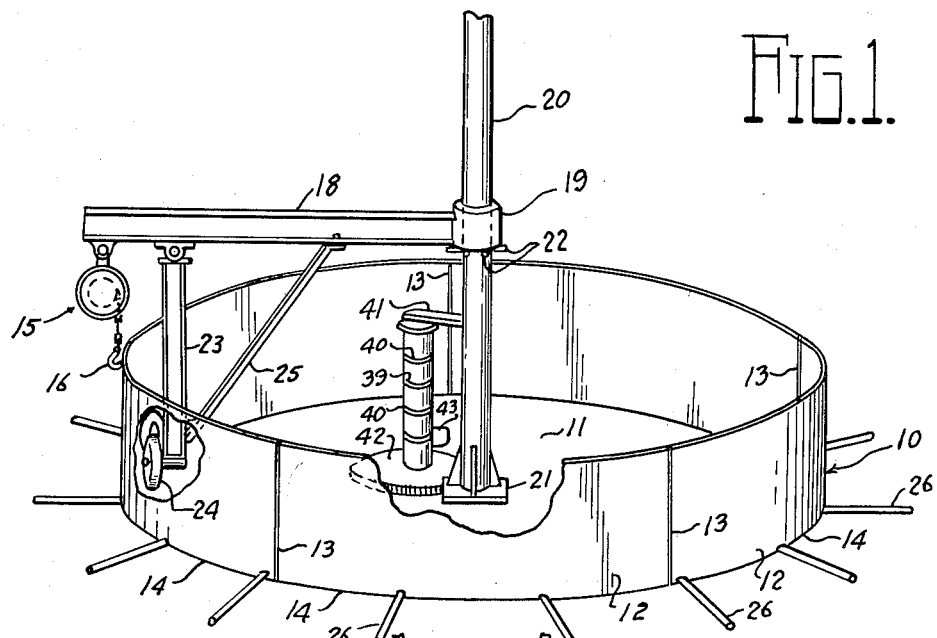
FIG. 1 is a perspective view, with parts broken away, showing a storage tank, in a partially fabricated condition, with various components of apparatus according to the invention in position.

Referring now in more detail to the drawings, a partially fabricated storage tank comprising a first ring thereof is indicated generally at 10 in FIG. 1. The tank 10 includes a metal bottom 11 made up of a plurality of flat sheets, and one ring or tier of a right cylindrical wall made up of a plurality of curved sheets 12 welded together along their abutting edges as indicated at 13. Each of the curved steel sheets 12 is also welded, along its bottom edge, to the tank bottom 11, as indicated at 14.

In accordance with the invention the tank portion 10 is fabricated by lifting each successive sheet 12 into position with a power hoist indicated generally at 15. A hook 16 of the hoist 15 engages the eye of a standard compression-type clip fitting which releasably engages the upper edge of each of the sheets during lifting. The hoist 15 is pinned to a boom 18 which is welded or otherwise rigidly attached at its inner extremity to a collar 19. The collar 19 is slidable with respect to a pole member 20 which is welded or otherwise rigidly attached to the tank bottom 11 through a base member 21, and is supported by fingers 22 welded or otherwise rigidly attached to the pole 20. The boom 18 is also supported, near its outer extremity, by an A shaped supporting frame 23, which is pinned thereto, and to which is attached, at its lower extremity, an axle carrying suitably journaled wheels 24. Pneumatic tires can advantageously be provided on the wheels 24 during fabrication of the tank part 10. The A frame 23 is supported in a generally vertical position by braces 25 which are temporarily welded or otherwise attached thereto and to the boom 18, so that a lateral force applied to the outer extremity of the boom will cause it to swing, with the supporting frame and wheels 24 moving therewith, in a circular path.

Figure 2:
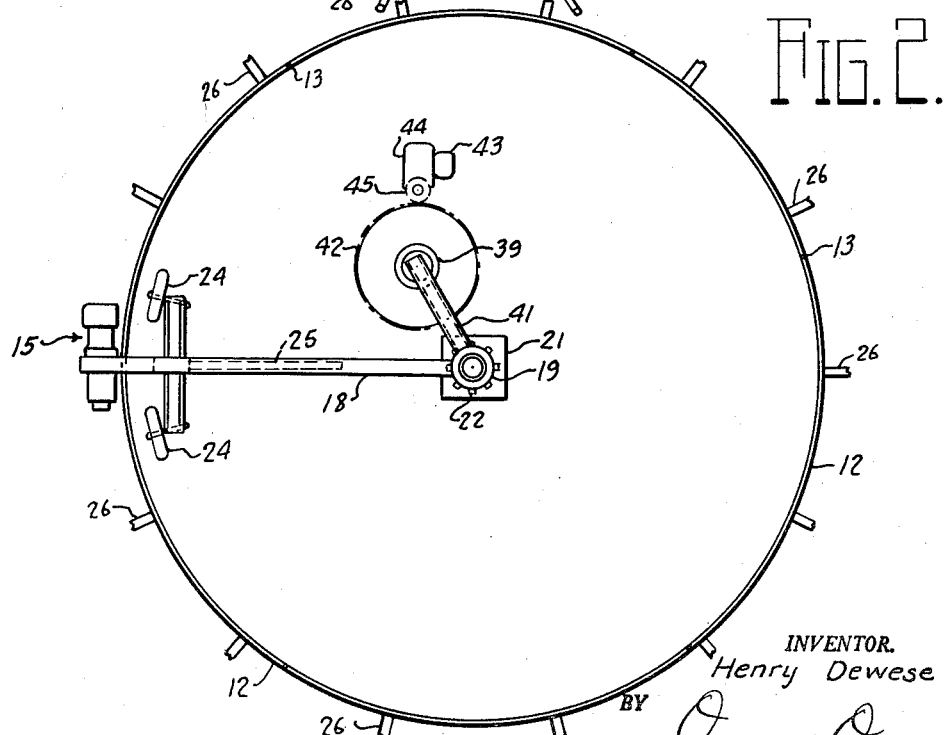
FIG. 2 is a plan view of the partially fabricated storage tank and apparatus of FIG. 1.

A first sheet 12 is engaged by a clip fitting received by the hook 16 of the hoist 15, and thereby lifted into position. Temporary or tack welds can then be made between the bottom 11 of the tank and the curved sheet 12, to support the latter, or other temporary supports can be provided therefor. The boom 18 is then moved, and with it the frame 23 and the wheels 24, an appropriate distance around the circumference of the tank, and a second sheet is lifted into position in the manner described, with a vertical edge abutting one of the vertical edges of the sheet 12 which has been tack welded or otherwise supported in position. The second sheet is appropriately positioned and lowered to ground level, so that its weight is no longer carried by the hoist, and is welded, along the abutting edge, to the first sheet. It will be observed that this weld is made at a time when both sheets are resting on their lower edges, so that both are under compression, which will be their ultimate condition in the finished tank. These various steps are then repeated with each succeeding curved sheet 12 until the right cylindrical ring 10 shown in FIGS. 1 and 2 has been completely fabricated.

The welds 14 between the bottom edge of each of the sheets 12 and the tank bottom 11 can be made at any desired time after each sheet is positioned. It is preferred, however, that these welds be made only after the entire ring 10 has been fabricated, so that minor radial adjustments thereof can be made to compensate for size or shape variations in the sheets 12. Horizontal supports 26 are then welded to the ring 10, extending radially outwardly therefrom, with their upper surfaces lying substantially in a horizontal plane just above the tank bottom 11.

Figure 3:
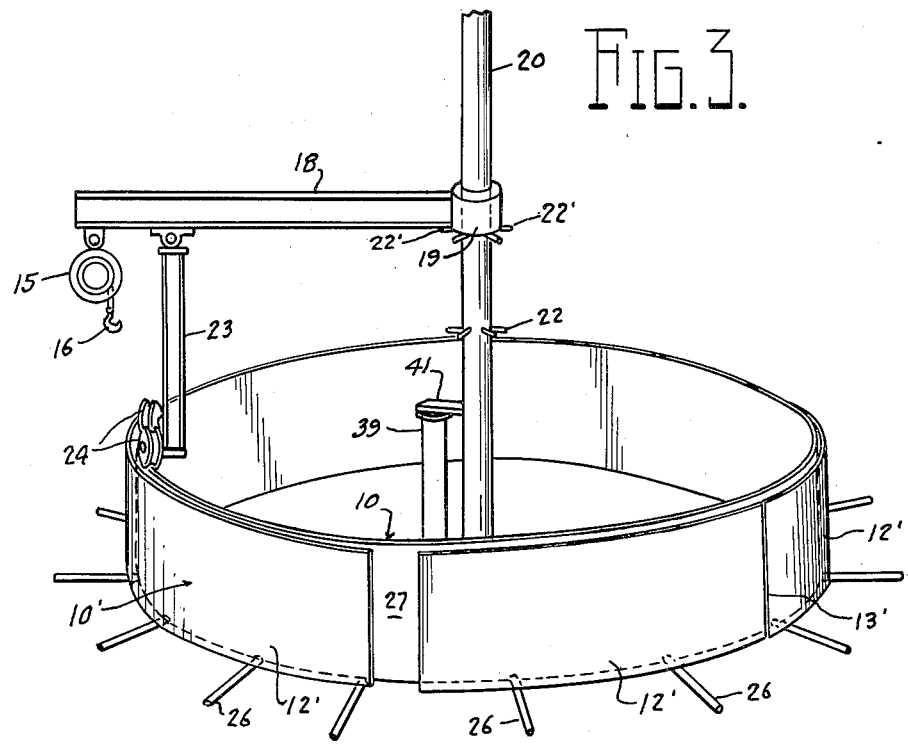
FIG. 3 is a view in perspective similar to FIG. 1 but showing the tank at a subsequent stage in fabrication.

After the ring 10 has been completely fabricated and welded to the tank bottom 11, the tires are removed from the wheels 24; the braces 25 between the boom 18 and the A frame 23 are eliminated; and the boom is raised from the height shown in FIG. 1 to that shown in FIG. 3, with the wheels 24 riding on the upper edge of the ring 10 as a track. Fingers 22' are then welded to the pole 20 to support the collar 19 at a height such that the boom 18 is substantially level. A second ring 10' is then assembled at ground level in generally the same manner as the ring 10, with individual sheets 12', and finally the entire ring 10' resting on the supports 26. The ring 10' is radially spaced outwardly from the ring 10 so that, after it has been completely fabricated except for a final weld, a gap 27 separates the edges of two sheets 12' which will ultimately abut and be welded together.

Lengths of pipe 28 are then welded in a horizontal position to one of the curved sheets 12' adjacent and extending across the gap 27 (see FIG. 5), and a length of pipe 29 is welded in a horizontal position to the curved sheet 12' on the opposite side of the gap 27, in alignment with and with an end abutting an end of each of the lengths of pipe 28. Straps 30 are then welded to the sheets 12' near the opposed ends of the pipes 28 and 29, and hooks 31 of the cables of coffing or other hoists 32 are engaged in holes in the straps 30. The hoists 32 are then used to draw together the sheets 12' which abut the gap 27, until the pipes 28 are partially telescoped within the pipes 29, and the gap 27 partially closed.

Figure 4:
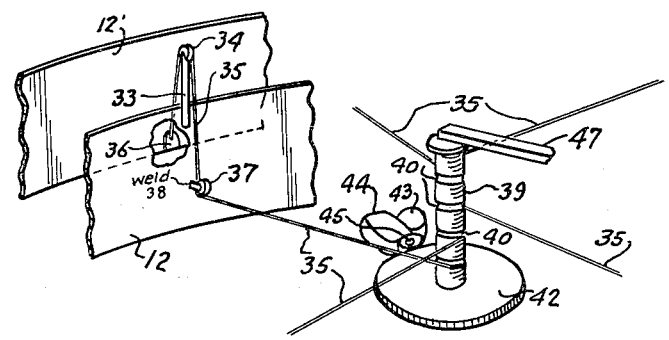
FIG. 4 is a perspective view showing details of the operation of part of the apparatus of FIGS. 1 and 3 in fabricating a storage tank.

Gin poles 33 (see FIG. 4) are then welded at a plurality of spaced points (see also FIGS. 5 and 6) to the ring 10. Each of the gin poles 33 can constitute a length of pipe or steel tubing, and is positioned generally vertically and extending above the top of the ring 10 a short distance. A pulley or sheave 34 is pinned to the top of each of the gin poles 33. An end of a cable 35 is received in an eye of an angle member 36 which is welded to the ring 10' at a point adjacent each of the gin poles 33. From the eye, the cable passes upwardly, over the pulley 34, downwardly and under a second pulley 37 which is pinned to a support 38 welded to the ring 10, and then horizontally across above the bottom 11 of the tank and to and around a cylindrical winding column 39. As is shown in FIGS. 4, 5 and 6, each of the pulleys 37 is positioned at a different level, so that the horizontal run of each of the cables 35 from its pulley 37 to the winding column 39 is at a different level, and corresponds with a groove 40 in the winding column. After all of the cables 35 (five in the embodiment of the invention shown) have been run from the winding column 39 to the angle 36 they are tightened so that each is under an equal tension, and anchored. The column is then rotated in a counterclockwise direction (FIG. 4) to lift the ring 10' to a point slightly above its final position, with the lower edge of the ring 10' as positioned just above the upper edge of the ring 10. The hoists 32 are then tightened until the gap 27 is completely closed. The winding column 39 is then rotated clockwise to lower the ring 10' to the position shown in FIG. 6. A horizontal weld is then made between the lower edge of the ring 10' and the upper edge of the ring 10, and, after any necessary cutting, the edges of the sheets 12' which formerly abutted the gap 27 are welded together.

As many additional rings as may be required to produce a storage tank of the desired height are then fabricated and positioned in the manner described. After fabrication of the cylindrical side walls of the tank is complete water can advantageously be pumped thereinto to check for leaks. If further welding is required, the hoist 15, boom 18 and pole 20 can be used in the manner described to support a platform holding a welder and his equipment at the desired level. The pole 20 can advantageously be used as a center support for the finished tank, preferably extending above the top thereof for use with a boom 18 and hoist 15 in normal maintenance of the tank.

As will be apparent from FIGS. 1–4, the winding column 39 is suitably journaled to an upper support 41, and is structurally integral with a gear 42 which is suitably journaled to the bottom 11 of the tank. The gear 42 is driven by a reversible motor 43, a reducer 44, and a gear 45.

It will be apparent that various changes and modifications can be made from the specific details disclosed in the attached drawings, and discussed in connection therewith, without departing from the spirit and scope of the attached claims. In one aspect the invention provides a method for producing and installing a portion of a liquid storage tank. This method comprises successively positioning in aligned, abutting relationship, a plurality of curved metal sheets, welding together abutting sheet edges to form a sprung ring having an effective diameter greater than that the tank portion is to form by virtue of a separation between two edges which will ultimately abut, raising the sprung ring to a desired height relative to the tank, drawing the two separated edges into abutment and welding them in such condition to form the tank portion, and welding the tank portion to a previously fabricated lower tank part.

In another aspect the invention provides apparatus for positioning and temporarily supporting curved metal sheets during fabrication of a liquid storage tank therefrom. Such apparatus comprises a boom, a vertically extending outer support for said boom, wheel means carried by said support and engaging the upper edge of a partially fabricated tank part as a supporting track, pole means for supporting the inner extremity of the boom, and means carried by the boom for engaging and lifting the sheets.

In still another aspect the invention provides apparatus for raising, relative to an assembled and installed ring constituting a part of a storage tank, a second ring concentric with the installed ring. Such apparatus comprises a take-up means, a plurality of vertically extending supports attached to the installed ring, a pulley journaled to each of the supports, a sheave journaled to the installed ring in alignment with each of the pulleys, a plurality of cable means each of which has an end attached to the second ring and which extends around a pulley and an aligned sheave and is engaged by the take-up means, and means for driving the take-up means whereby the effective length of each of the cable means is shortened, and the second ring is raised relative to the installed ring.

This is a division of Serial No. 601,663, filed August 2, 1956, now Patent Number 2,918,179.

What I claim is:

1. A method for producing and installing a portion of a liquid storage tank which comprises providing a tank foundation, assembling a base ring on said foundation, securing said base ring to said foundation, successively positioning in aligned, abutting relationship, a plurality of curved metal sheets around and concentric with respect to said base ring, welding together abutting sheet edges to form a sprung ring having an effective diameter greater than that of the tank portion it is to form by virtue of a separation between two edges which will ultimately abut, raising the sprung ring to a desired height relative to the tank, drawing the two separated edges into abutment and welding them in such condition to form the tank portion, welding the tank portion to a previously fabricated lower tank part, and repeating the latter six steps until a tank of desired height is produced.

2. A method according to claim 1 characterized by the additional steps of securing the open edges of the sprung ring in spaced relationship while said ring is being raised, and releasing the spaced edges of said sprung ring after said ring is elevated to the proper position for final securement thereof.

References Cited in the file of this patent

UNITED STATES PATENTS

| 789,817 | Pyle et al. | May 16, 1905 |
| 1,839,578 | Morton | Jan. 5, 1932 |
| 1,872,810 | Raymond | Aug. 23, 1932 |
| 2,679,250 | Terhune | May 25, 1954 |